(12) United States Patent          (10) Patent No.:     US 12,560,112 B2

Gignac et al.                          (45) Date of Patent:      Feb. 24, 2026

---

(54) LUBRICANT FILTER ASSEMBLY

(71) Applicant: Pratt & Whitney Canada Corp.,
Longueuil (CA)

(72) Inventors: Stephane Gignac, Boucherville (CA);
Edith Morin, Chambly (CA); **Joanna
Radon**, Rakszawa (PL)

(73) Assignee: Pratt & Whitney Canada Corp.,
Longueuil (CA)

( * ) Notice:  Subject to any disclaimer, the term of this
patent is extended or adjusted under 35
U.S.C. 154(b) by 476 days.

(21) Appl. No.: 18/082,989

(22) Filed:    Dec. 16, 2022

(65)            Prior Publication Data

US 2024/0200477 A1     Jun. 20, 2024

(51) Int. Cl.
B01D 29/15       (2006.01)
B01D 35/00       (2006.01)
F01M 1/10        (2006.01)

(52) U.S. Cl.
CPC .............. F01M 1/10 (2013.01); B01D 29/15
(2013.01); B01D 35/005 (2013.01);
(Continued)

(58) Field of Classification Search
CPC .......... F01M 1/10; F01M 11/03; B01D 29/15;
B01D 35/005; B01D 2201/295; B01D
2201/302; B01D 2201/304; B01D
2201/4053; B01D 2201/4061; B01D
2201/4076; B01D 29/21; B01D 29/96;
B01D 35/147; B01D 2201/301; B01D
2201/305; B01D 2201/342; B01D
2201/347; B01D 2201/4015; B01D 35/30;
B01D 29/114
See application file for complete search history.

(56)              References Cited

U.S. PATENT DOCUMENTS 8,177,971 B2     5/2012  Bittle
9,067,156 B2     6/2015  Moore
              (Continued)

FOREIGN PATENT DOCUMENTS

DE       102008036055 A1 *   2/2010   .......... B01D 35/153
DE       102008036055 B4     4/2010
              (Continued)

OTHER PUBLICATIONS

EP search report for EP23217310.4 dated May 17, 2024.

*Primary Examiner* — Waqaas Ali

(74) *Attorney, Agent, or Firm* — Getz Balich LLC

(57)            ABSTRACT

A lubricant filter assembly includes a filter cartridge includ-
ing a cylindrical filter medium and a top cap. The cylindrical
filter medium extends circumferentially about a longitudinal
axis of the filter assembly. The cylindrical filter medium
extends between and to a first filter end and a second filter
end along the longitudinal axis. The cylindrical filter
medium forms a filter passage extending from the first filter
end to the second filter end. The top cap is disposed on the
cylindrical filter medium at the first filter end. The top cap
includes an inner diameter ring, an outer diameter ring, and
an interior packing. The inner diameter ring forms a first
filter outlet passage coincident with the filter passage. The
inner diameter ring includes a first set of locking tabs. The
outer diameter ring radially circumscribes the cylindrical
filter medium.

15 Claims, 10 Drawing Sheets

(52) U.S. Cl.
CPC .. *B01D 2201/295* (2013.01); *B01D 2201/302*
(2013.01); *B01D 2201/304* (2013.01); *B01D*
*2201/4053* (2013.01); *B01D 2201/4061*
(2013.01); *B01D 2201/4076* (2013.01)

(56) References Cited

U.S. PATENT DOCUMENTS

| | | | |
|---|---|---|---|
| 9,492,768 | B2 | 11/2016 | Fick |
| 10,052,575 | B2 | 8/2018 | Downs |
| 11,305,213 | B2 | 4/2022 | Downs |
| 2008/0190839 | A1 | 8/2008 | Girondi |
| 2020/0330907 | A1 | 10/2020 | Okamoto |
| 2021/0379514 | A1 | 12/2021 | Massara |
| 2022/0249998 | A1 | 8/2022 | Stamey, Jr. |
| 2023/0398480 | A1 | 12/2023 | Schwartz |
| 2024/0200477 | A1 | 6/2024 | Gignac |

FOREIGN PATENT DOCUMENTS

| | | | |
|---|---|---|---|
| EP | 3609594 | B1 | 8/2021 |
| WO | 2024173589 | A1 | 8/2024 |

* cited by examiner

LUBRICANT FILTER ASSEMBLY

TECHNICAL FIELD

This disclosure relates generally to gas turbine engines for use with aircraft propulsion systems and, more particularly, to lubricant filter assemblies for gas turbine engines.

BACKGROUND OF THE ART

Gas turbine engines for aircraft propulsion systems may include lubricant systems configured to provide lubrication and cooling to various gas turbine engine components. These lubricant systems may include a lubricant filter configured to remove contaminants from circulating lubricant. Various lubricant filter assemblies are known in the art. While these known lubricant filter assemblies have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a lubricant filter assembly includes a filter cartridge including a cylindrical filter medium and a top cap. The cylindrical filter medium extends circumferentially about a longitudinal axis of the filter assembly. The cylindrical filter medium extends between and to a first filter end and a second filter end along the longitudinal axis. The cylindrical filter medium forms a filter passage extending from the first filter end to the second filter end. The top cap is disposed on the cylindrical filter medium at the first filter end. The top cap includes an inner diameter ring, an outer diameter ring, and an interior packing. Each of the inner diameter ring, the outer diameter ring, and the interior packing extend circumferentially about the longitudinal axis. The inner diameter ring forms a first filter outlet passage coincident with the filter passage. The inner diameter ring includes a first set of locking tabs. The outer diameter ring radially circumscribes the cylindrical filter medium.

In any of the aspects or embodiments described above and herein, the outer diameter ring may include an outer radial side and the interior packing may be disposed at the outer radial side.

In any of the aspects or embodiments described above and herein, the inner diameter ring may extend between and to a first axial end and a second axial end. The second axial end may be disposed within the filter passage. The interior packing may be disposed at the first axial end.

In any of the aspects or embodiments described above and herein, the inner diameter ring may include an inner radial surface and the interior packing may be disposed at the inner radial surface.

In any of the aspects or embodiments described above and herein, the lubricant filter assembly may further include a filter cover attached to the filter cartridge. The filter cover may include a second set of locking tabs. The second set of locking tabs may be configured to engage the first set of locking tabs to axially fix the filter cover relative to the filter cartridge.

In any of the aspects or embodiments described above and herein, the filter cover may include an exterior cover portion, a filter attachment ring portion, and a plurality of arms. The exterior cover portion may be mounted to the filter attachment ring portion by the plurality of arms. The plurality of arms may be circumferentially spaced about the longitudinal axis. The filter attachment ring portion may be attached to the filter cartridge.

In any of the aspects or embodiments described above and herein, the filter attachment ring portion may include a cover axially-extending portion and a cover outer diameter ring. The cover axially-extending portion may form a second filter outlet passage coincident with the first filter outlet passage. The cover outer diameter ring may extend axially from the cover axially-extending portion. The filter cover may include an exterior packing. The exterior packing may be disposed on the cover outer diameter ring radially outside of the interior packing. Each of the cover axially-extending portion, the cover outer diameter ring, and the exterior packing may extend circumferentially about the longitudinal axis.

In any of the aspects or embodiments described above and herein, the cover outer diameter ring may be sealingly engaged with the interior packing.

In any of the aspects or embodiments described above and herein, the lubricant filter assembly may further include a filter housing. The filter housing may include a housing body. The housing body may form an inlet, an outlet, a filter bore, and a filter bore opening. The filter bore may include an inlet bore and an outlet bore. The inlet bore may extend axially from the inlet to the outlet bore. The outlet bore may extend axially from the inlet bore to the filter bore opening. The outlet may be disposed at the outlet bore. The filter cartridge may be disposed within the filter bore with the first filter end at the outlet and the second filter end at the inlet.

In any of the aspects or embodiments described above and herein, the inlet bore may have a first diameter and the outlet bore may have a second diameter. The second diameter may be greater than the first diameter.

In any of the aspects or embodiments described above and herein, the housing body may form a set of clocking slots circumferentially spaced about the inlet bore. The outer diameter ring may include a set of clocking tabs circumferentially spaced about the top cap. Each clocking tab of the set of clocking tabs may be positioned within a respective clocking slot of the set of clocking slots to limit a rotation of the filter cartridge within the filter housing.

In any of the aspects or embodiments described above and herein, the lubricant filter assembly may further include a filter cover attached to the filter cartridge and the filter housing. The filter cover may include a second set of locking tabs. The second set of locking tabs may be configured to engage the first set of locking tabs to axially fix the filter cover relative to the filter cartridge.

In any of the aspects or embodiments described above and herein, the filter cover may include an exterior packing disposed radially outside of the interior packing and the exterior packing may be sealingly engaged with the housing body.

In any of the aspects or embodiments described above and herein, the lubricant filter assembly may further include a clocking pin. The filter cover may include a first clocking pin aperture and the filter housing may include a second clocking pin aperture. The clocking pin may be configured to be positioned within the first clocking pin aperture and the second clocking pin aperture with the filter cover attached to the filter housing.

According to another aspect of the present disclosure, a lubricant filter assembly includes a filter cartridge and a filter cover. The filter cartridge includes a cylindrical filter medium and a top cap. The cylindrical filter medium extends circumferentially about a longitudinal axis of the filter assembly. The cylindrical filter medium extends between and to a first filter end and a second filter end along the longitudinal axis. The cylindrical filter medium forms a filter passage extending from the first filter end to the second filter end. The top cap is disposed on the cylindrical filter medium at the first filter end. The top cap includes an inner diameter ring. The inner diameter ring forms a first filter outlet passage coincident with the filter passage. The inner diameter ring includes a first set of locking tabs. The filter cover is attached to the filter cartridge. The filter cover includes a second set of locking tabs. The second set of locking tabs is configured to engage the first set of locking tabs to axially fix the filter cover relative to the filter cartridge.

In any of the aspects or embodiments described above and herein, the filter cartridge may further include an interior packing. The interior packing may be disposed at the inner diameter ring. The interior packing may be sealingly engaged with the filter cover.

In any of the aspects or embodiments described above and herein, the filter cover may include a spigot. The spigot may be configured for positioning within the first filter outlet passage with the interior packing sealingly engaged with the spigot.

In any of the aspects or embodiments described above and herein, the spigot may form a second filter outlet passage through the filter cover. The second filter outlet passage may be coincident with the filter passage.

According to another aspect of the present disclosure, a lubrication system is configured to direct a lubricant to one or more components of a gas turbine engine. The lubrication system includes a lubricant filter assembly configured to remove contaminants from the lubricant. The lubricant filter assembly has a longitudinal axis. The lubricant filter assembly includes a filter housing, a filter cartridge, and a filter cover. The filter housing includes a housing body. The housing body forms an inlet, an outlet, a filter bore, and a filter bore opening. The filter bore extends from the inlet to the filter bore opening. The housing body forms a plurality of clocking slots distributed about the longitudinal axis. The filter cartridge includes a filter medium and a top cap. The filter medium extends circumferentially about a longitudinal axis of the filter assembly. The filter medium extends between and to a first filter end and a second filter end along the longitudinal axis. The top cap is disposed on the cylindrical filter medium at the first filter end. The top cap includes a plurality of clocking tabs. Each clocking tab of the plurality of clocking tabs is disposed within a respective clocking slot of the plurality of clocking slots to limit a rotation of the filter cartridge within the housing. The filter cover is mounted to the housing at the filter bore opening. The filter cover is engaged with the filter cartridge such that the filter cover is axially fixed relative to the filter cartridge and the filter cover is rotatable relative to the filter cartridge about the longitudinal axis.

In any of the aspects or embodiments described above and herein, the filter cartridge may include an interior packing sealingly engaged with the filter cover and the filter cover may include an exterior packing sealingly engaged with the filter housing.

The present disclosure, and all its aspects, embodiments and advantages associated therewith will become more readily apparent in view of the detailed description provided below, including the accompanying drawings.

DETAILED DESCRIPTION

Figure 1:
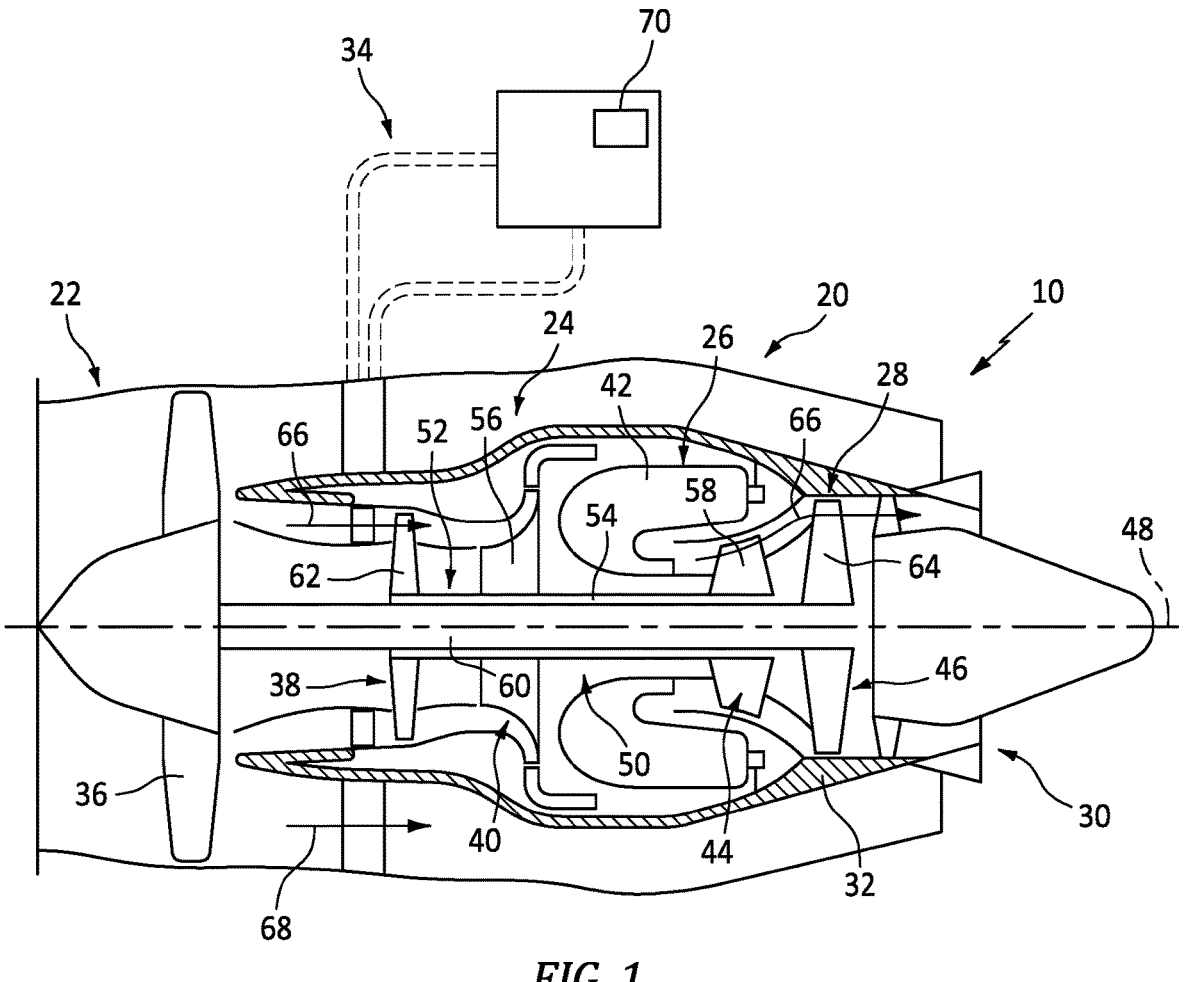
FIG. 1 illustrates a schematic, cutaway view of a propulsion system for an aircraft, in accordance with one or more embodiments of the present disclosure.

FIG. 1 illustrates a propulsion system 10 for an aircraft (e.g., a fixed wing aircraft, a rotary wing aircraft, etc.). For example, the propulsion system 10 may be mounted to or otherwise formed by a portion of the aircraft such as, but not limited to, a wing or fuselage of the aircraft. The aircraft propulsion system 10 of FIG. 1 includes a gas turbine engine 20. The present disclosure is not limited to gas turbine engine applications, and aspects of the present disclosure may also be applicable to other aircraft propulsion systems (e.g., battery electric propulsion systems) or equipment including lubricant or other fluid filtering systems.

The gas turbine engine 20 of FIG. 1 is configured as a turbofan engine. However, the present disclosure is not limited to any particular configuration of gas turbine engine for the propulsion system 10, and examples of gas turbine engine configurations may include, but are not limited to, a turboprop engine, a turbojet engine, a propfan engine, an auxiliary power unit (APU) system, or the like. The gas turbine engine 20 of FIG. 1, for example, includes a fan section 22, a compressor section 24, a combustor section 26, a turbine section 28, an exhaust section 30, and an engine static structure 32, and a lubrication system 34. The fan section 22 includes a fan 36. The compressor section 24 may include a low-pressure compressor (LPC) 38 and a high-pressure compressor (HPC) 40. The combustor section 26 includes an annular combustor 42. The turbine section 28 may include and a high-pressure turbine (HPT) 44 a low-pressure turbine (LPT) 46.

The gas turbine engine 20 sections 22, 24, 26, 28, and 30 of FIG. 1 are arranged sequentially along an axial centerline 48 (e.g., a rotational axis) of the propulsion system 10. The engine static structure 32 may include, for example, one or more engine cases for the gas turbine engine 20. The engine static structure 32 may additionally include cowlings, bearing assemblies, or other structural components of the gas turbine engine 20. The one or more engine cases house and/or structurally support one or more of the engine sections 22, 24, 26, 28, and 30.

The gas turbine engine 20 of FIG. 1 further includes a first rotational assembly 50 (e.g., a high-pressure spool) and a second rotational assembly 52 (e.g., a low-pressure spool). The first rotational assembly 50 and the second rotational assembly 52 are mounted for rotation about the axial centerline 48 relative to the engine static structure 32.

The first rotational assembly 50 includes a first shaft 54, a bladed first compressor rotor 56 for the high-pressure compressor 40, and a bladed first turbine rotor 58 for the high-pressure turbine 44. The first shaft 54 interconnects the bladed first compressor rotor 56 and the bladed first turbine rotor 58. The second rotational assembly 52 includes a second shaft 60, a bladed second compressor rotor 62 for the low-pressure compressor 38, and a bladed second turbine rotor 64 for the low-pressure turbine 46. The second shaft 60 interconnects the bladed second compressor rotor 62 and the bladed second turbine rotor 64. The second shaft 60 may be directly or indirectly connected to the fan 36 to drive rotation of the fan 36. For example, the second shaft 60 may be connected to the fan 36 by one or more speed-reducing gear assemblies (not shown) to drive the fan 36 at a reduced rotational speed relative to the second shaft 60.

During operation of the propulsion system 10 of FIGS. 1, ambient air enters the propulsion system 10 through the fan section 22 and is directed into a core flow path 66 and a bypass flow path 68 by rotation of the fan 36. The core flow path 66 extends generally axially along the axial centerline 48 within the gas turbine engine 20. More particularly, the core flow path 66 extends axially through the gas turbine engine 20 sections 24, 26, 28, and 30 of FIG. 1. The air within the core flow path 66 may be referred to as "core air." The core air is compressed by the bladed second compressor rotor 62 and the bladed first compressor rotor 56 and directed into a combustion chamber of the combustor 42. Fuel is injected into the combustion chamber and mixed with the compressed core air to form a fuel-air mixture. This fuel-air mixture is ignited and combustion products thereof, which may be referred to as "core combustion gas," flow through and sequentially cause the bladed first turbine rotor 58 and the bladed second turbine rotor 64 to rotate. The rotation of the bladed first turbine rotor 58 and the bladed second turbine rotor 64 respectively drive rotation of the first rotational assembly 50 and the second rotational assembly 52. Rotation of the second rotational assembly 52 further drives rotation of the fan 36, as discussed above. The bypass flow path 68 is formed outside of the gas turbine engine 20, for example, radially between the gas turbine engine and a housing (e.g., a nacelle) of the propulsion system 10.

The lubrication system 34 is in fluid communication with and configured to direct a lubricant to one or more components (e.g., rotational components) of the gas turbine engine in need of lubrication such as, but not limited to, bearings, shafts, gears and/or gear assemblies, and the like. The lubrication system 34 may include a lubricant pump (not shown), fluid conduits, a lubricant reservoir (not shown), and a filter assembly 70. The lubrication system 34 may also include additional components such as, but not limited to, valves, heat exchangers, etc. However, a lubrication system, such as the lubrication system 34, may include more, fewer, or alternative components. In one example, the lubricant pump may direct a lubricant (e.g., oil) from the lubricant reservoir to one or more components of the gas turbine engine 20, back from the one or more components to the lubricant reservoir, and through the filter assembly 70. The filter assembly 70 may be used to remove contaminants from the lubricant prior to directing the lubricant toward the one or more components.

Figure 2:
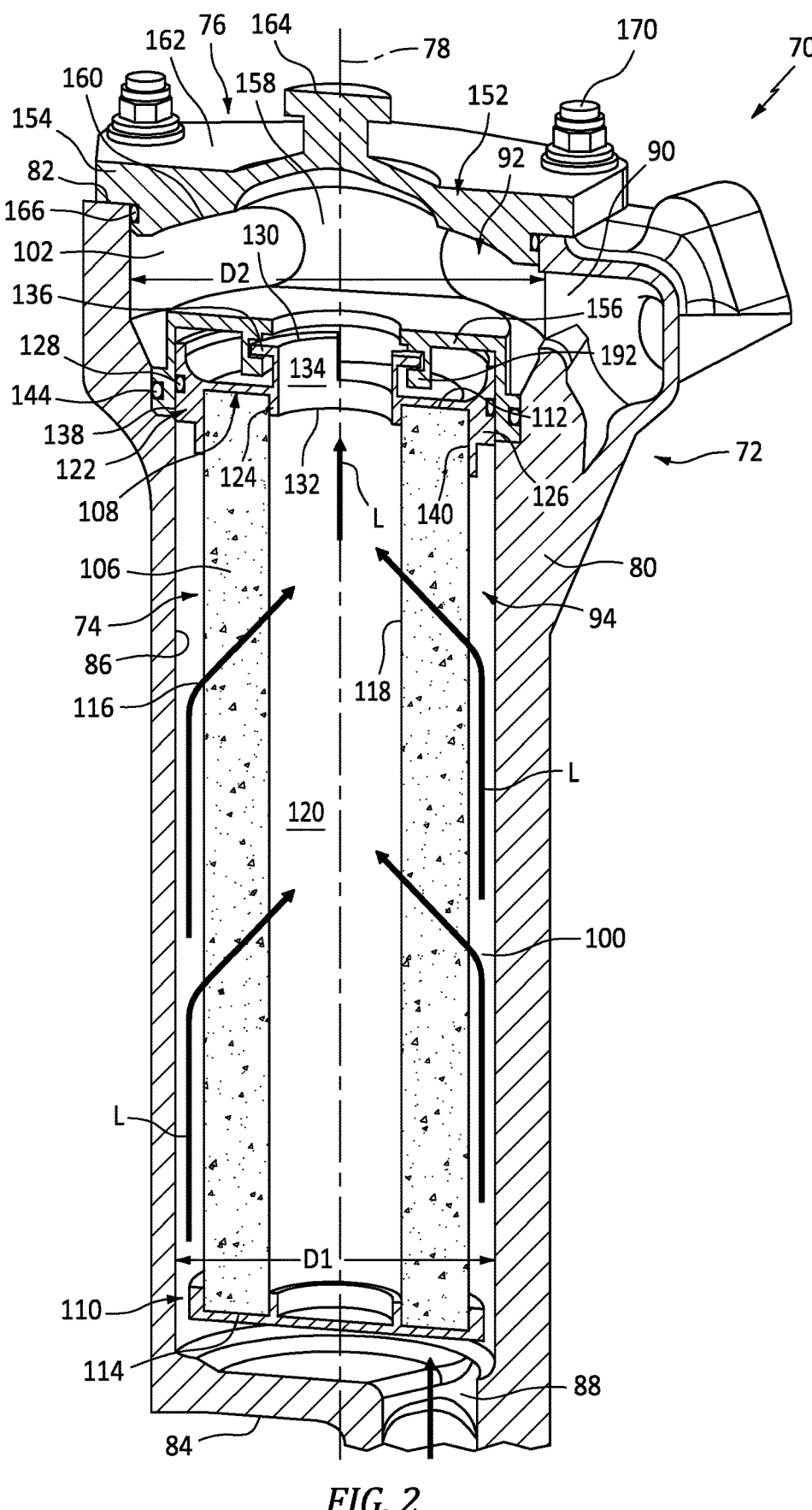
FIG. 2 illustrates a cutaway view of a filter assembly, in accordance with one or more embodiments of the present disclosure.

Referring to FIGS. 2-6, an embodiment of the filter assembly 70 is provided. FIG. 2 illustrates a cutaway view of the filter assembly 70. The filter assembly 70 includes a filter housing 72, a filter cartridge 74, and a filter cover 76. The filter housing 72, filter cartridge 74, and filter cover 76 are illustrated in FIG. 2 extending along a longitudinal axis 78 of the filter assembly 70.

The filter housing 72 includes a housing body 80. The housing body 80 extends along the longitudinal axis 78 between and to a first end 82 of the filter housing 72 and a second end 84 of the filter housing 72. The housing body 80 further extends circumferentially about (e.g., completely around) the longitudinal axis 78. The housing body 80 includes an interior surface 86. The housing body 80 forms an inlet 88 (e.g., a lubricant inlet), an outlet 90 (e.g., a lubricant outlet), a filter opening 92, and a filter bore 94. The housing body 80 may additionally form one or more clocking slots 96, a clocking pin aperture 98, and one or more cover fastener apertures (not shown). The inlet 88 is disposed at (e.g., on, adjacent, or proximate) the second end 84. The outlet 90 and the filter opening 92 are disposed at (e.g., on, adjacent, or proximate) the first end 82. The filter opening 92 is formed through the housing body 80 (e.g., from an interior of the housing body 80 to an exterior of the housing body 80) at (e.g., on, adjacent, or proximate) the first end 82.

The interior surface 86 surrounds and forms the filter bore 94 through the housing body 80. The filter bore 94 extends along the longitudinal axis 78 from the inlet 88 to the filter opening 92. The filter bore 94 of FIG. 2 includes an inlet bore 100 and an outlet bore 102. The inlet bore 100 and the outlet bore 102 may be concentrically disposed along the longitudinal axis 78. The inlet bore 100 extends (e.g., axially extends) from the inlet 88 to the outlet bore 102. The outlet bore 102 extends (e.g., axially extends) from the inlet bore 100 to the filter opening 92. The inlet 88 is in fluid communication with the filter bore 94 at (e.g., on, adjacent, or proximate) the inlet bore 100. The outlet 90 is in fluid communication with the filter bore 94 at (e.g., on, adjacent, or proximate) the outlet bore 102. The inlet bore 100 of FIG. 2 includes a first diameter D1. The outlet bore 102 of FIG. 2 includes a second diameter D2. The second diameter D2 may be greater than the first diameter D1. The greater second diameter D2 of the outlet bore 102 may facilitate a reduction in the risk of introducing contaminants from the filter cartridge 74 into the lubrication system 34 as the filter cartridge 74 is removed from the filter housing 72 (e.g., for periodic filter cleaning or replacement). For example, as the filter cartridge 74 is removed from the filter housing 72, the outlet bore 102 may become exposed to the contamination portion of the filter cartridge 74. The greater second diameter D2 of the outlet bore 102 may reduce the risk of physical contact between the filter cartridge 74 and portions of the filter housing 72 at (e.g., on, adjacent, or proximate) the outlet bore 102, which physical contact may otherwise cause contaminants to become dislodged from the filter cartridge 74 and possibly enter the outlet 90.

Figure 3:
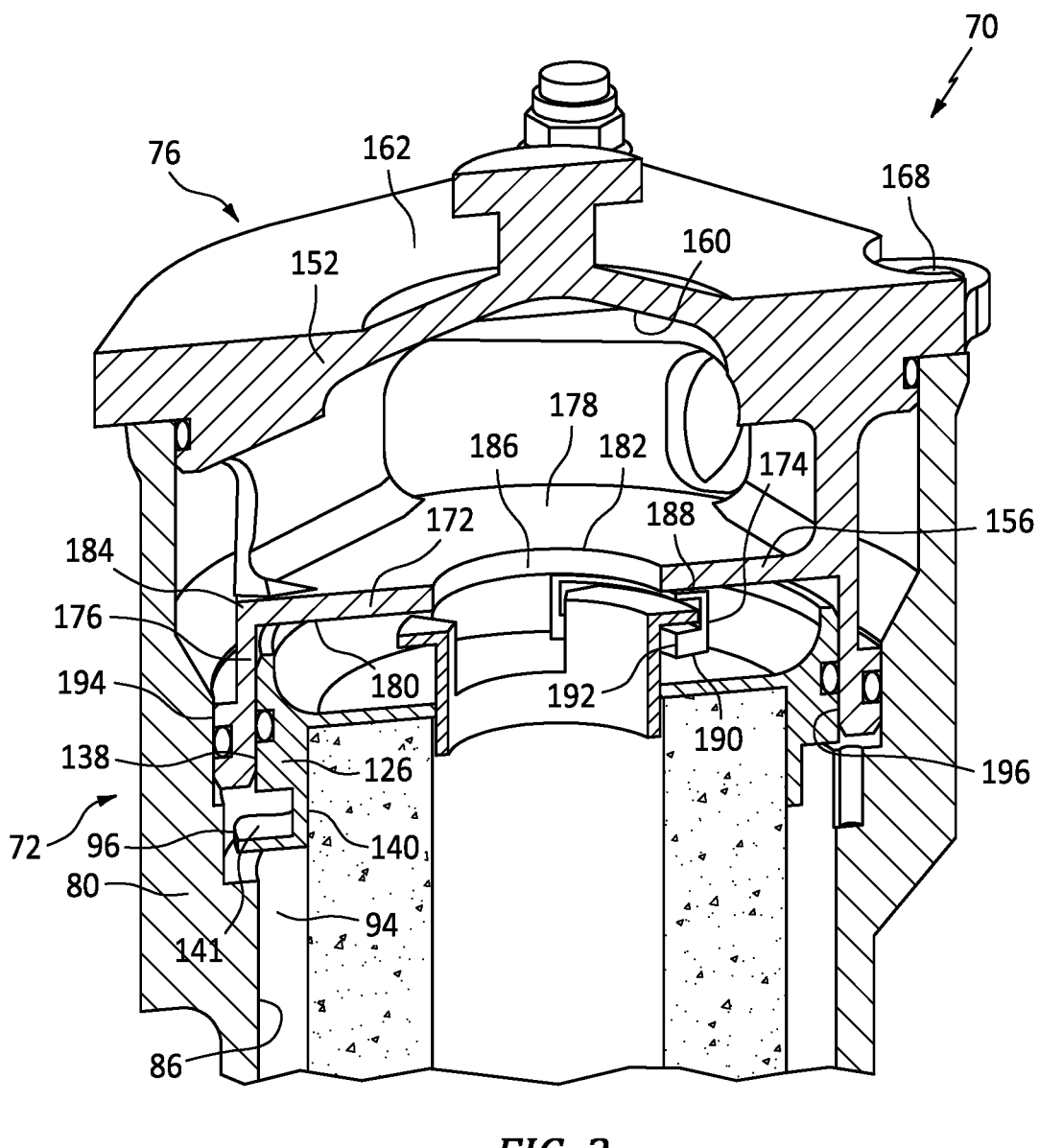
FIG. 3 illustrates a cutaway view of a portion of the filter assembly of FIG. 2, in accordance with one or more embodiments of the present disclosure.
Figure 4:
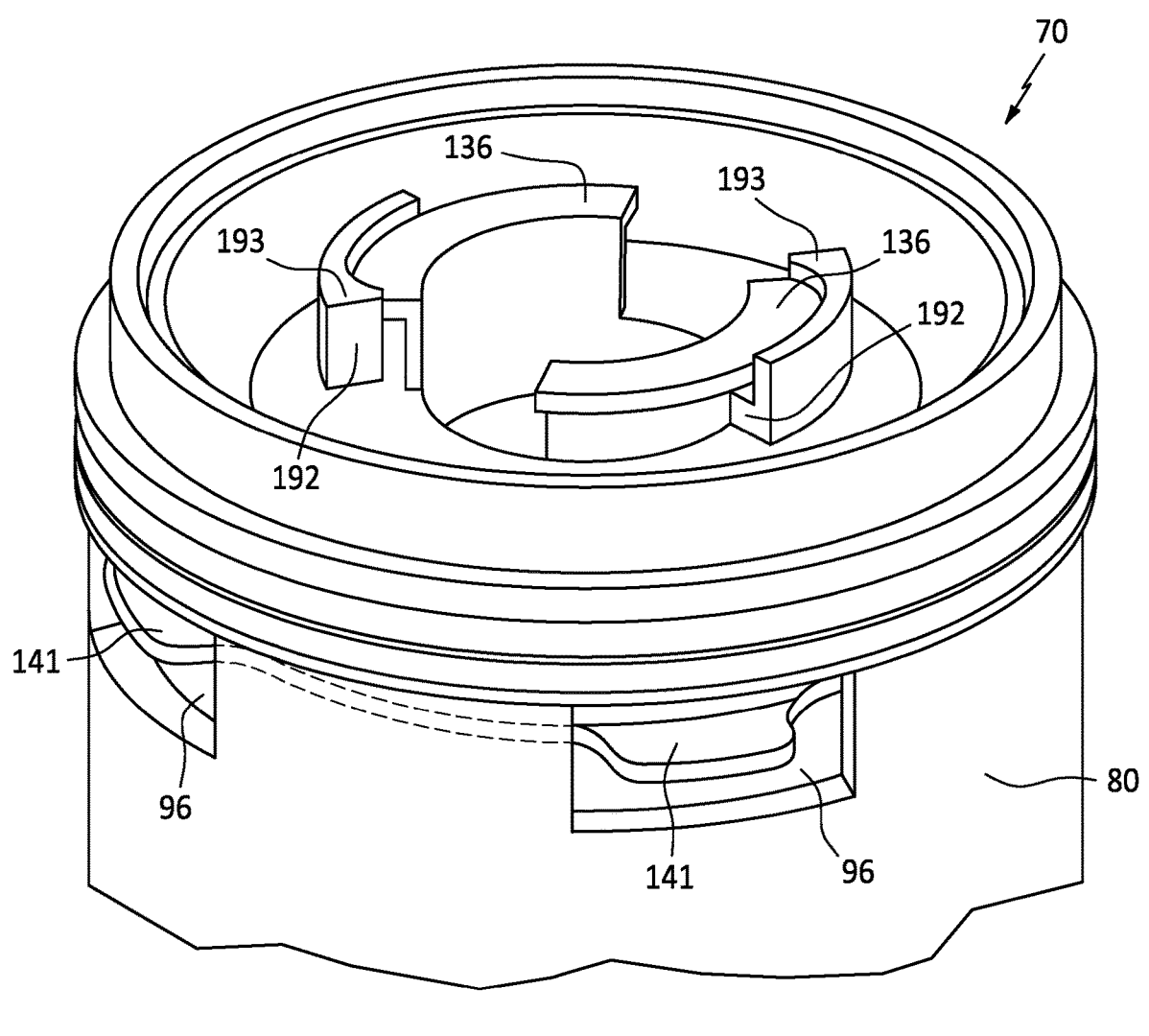
FIG. 4 illustrates a cutaway view of a portion of the filter assembly of FIG. 2, in accordance with one or more embodiments of the present disclosure.

FIGS. 3 and 4 illustrate cutaway portions of the filter housing 72 showing the one or more clocking slots 96. The clocking slots 96 are formed through the interior surface 86. For example, the clocking slots 96 of FIGS. 3 and 4 extend through the housing body 80 and the interior surface 86 in an axial direction, which axial direction generally extends from the first end 82 toward the second end 84. The clocking slots 96 may be disposed (e.g., axially disposed) at (e.g., on, adjacent, or proximate) an interface between the inlet bore 100 and the outlet bore 102. For example, the clocking slots 96 may be disposed coincident with the inlet bore 100, the outlet bore 102, or the inlet bore 100 and the outlet bore 102. The clocking slots 96 may be circumferentially distributed (e.g., circumferentially spaced) about the longitudinal axis 78.

Figure 6:
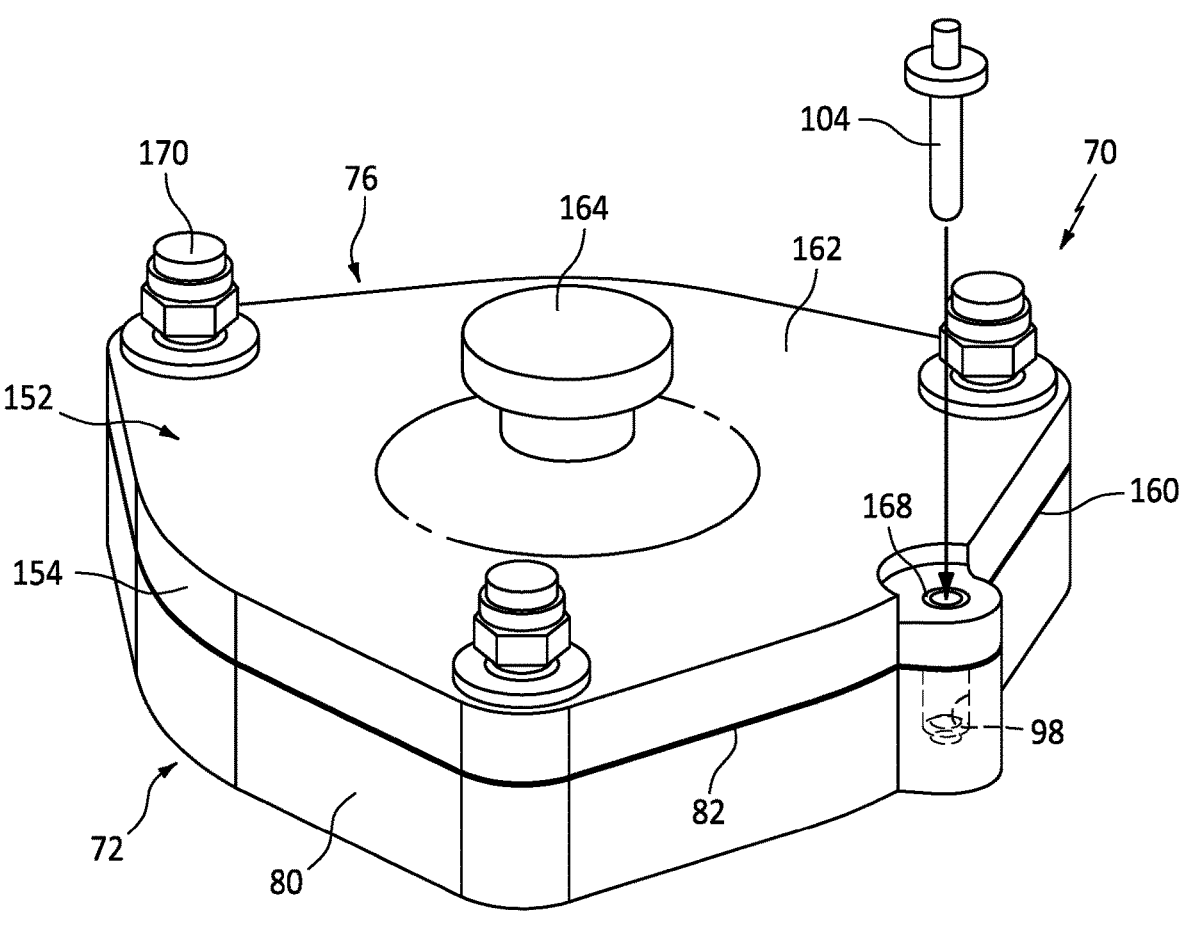
FIG. 6 illustrates a perspective view of a top portion of the filter assembly of FIG. 2, in accordance with one or more embodiments of the present disclosure.

FIG. 6 illustrates portion of the housing body 80 forming the clocking pin aperture 98. The clocking pin aperture 98 is configured to receive a clocking pin 104 of the filter assembly 70. The clocking pin aperture 98 is disposed at (e.g., on, adjacent, or proximate) the first end 82. The locking pin aperture 98 of FIG. 6 extends (e.g., axially extends) through the housing body 80 from the first end 82 toward the second end 84.

FIG. 2 illustrates the filter cartridge 74 disposed within the filter bore 94. The filter cartridge 74 includes a filter medium 106, a top cap 108, and a centering ring 110. The filter medium 106 may be any medium known in the art which is suitable for removing and retaining contaminants (e.g., particulate matter) from a lubricant (e.g., oil) flowing through the medium. The filter cartridge 74 extends along the longitudinal axis 78 between and to a first end 112 of the filter medium 106 and a second end 114 of the filter medium 106. With the filter cartridge 74 installed in the filter housing 72, the first end 112 is generally disposed proximate the first end 82 while the second end 114 is generally disposed proximate the second end 84. The filter medium 106 may generally be configured as a cylindrical body. The filter medium 106 includes an exterior surface 116 and an interior surface 118. Each of the exterior surface 116 and the interior surface 118 may extend between and to the first end 112 and the second end 114. With the filter cartridge 74 installed in the filter housing 72, the exterior surface 116 faces and is spaced from (e.g., radially spaced from) the interior surface 86. The interior surface 118 forms a filter passage 120 through the filter medium 106 along the longitudinal axis 78. The filter passage 120 extends between and through the first end 112 and the second end 114.

As shown in FIGS. 2 and 3, the top cap 108 is disposed on the filter medium 106 at (e.g., on, adjacent, or proximate) the first end 112. The top cap 108 includes a cap body 122 and an interior packing 128. The cap body 122 may be in contact with or otherwise attached to the filter medium 106 on the first end 112, the exterior surface 116, and/or the interior surface 118. The cap body 122 includes an inner diameter ring 124 and an outer diameter ring 126. Each of the inner diameter ring 124, the outer diameter ring 126, and the interior packing 128 extend circumferentially about (e.g., completely around) the longitudinal axis 78.

The inner diameter ring 124 is disposed at (e.g., on, adjacent, or proximate) the filter passage 120. The inner diameter ring 124 of FIG. 2 extends between (e.g., axially between) and to a first end 130 of the inner diameter ring 124 and a second end 132 of the inner diameter ring 124. The first end 130 may be spaced (e.g., axially spaced) outward of the first end 112 (e.g., in an axial direction away from the filter medium 106). The second end 132 may be disposed within the filter passage 120. For example, a portion of the inner diameter ring 124 may be disposed within the filter passage 120 and may be disposed at (e.g., on, adjacent, or proximate) the interior surface 118. The inner diameter ring 124 forms a filter outlet passage 134 through the top cap 108 along the longitudinal axis 78. The filter outlet passage 134 extends between and through the first end 130 and the second end 132. The filter outlet passage 134 is coincident with the filter passage 120, for example, along the longitudinal axis 78.

The inner diameter ring 124 includes one or more locking tabs 136. The locking tabs 136 may be referred to herein as a "first set of locking tabs" 136. The locking tabs 136 may be disposed at (e.g., on, adjacent, or proximate) the first end 130. The locking tabs 136 may generally extend outward (e.g., radially outward) at (e.g., on, adjacent, or proximate) the first end 130. The locking tabs 136 may be circumferentially distributed (e.g., circumferentially spaced) about the longitudinal axis 78.

The outer diameter ring 126 is disposed outward (e.g., radially outward) of the inner diameter ring 124. The outer diameter ring 126 includes an outer radial side 138, an inner radial side 140, and one or more clocking tabs 141. The outer radial side 138 extends circumferentially about (e.g., completely around) the longitudinal axis 78. The interior packing 128 may be disposed at (e.g., on, adjacent, or proximate) the outer radial side 138. The inner radial side 140 may be disposed in contact with or otherwise be attached to the exterior surface 116. The clocking tabs 141 extend radially outward at the outer radial side 138. The clocking tabs 141 may be circumferentially distributed (e.g., circumferentially spaced) about the longitudinal axis 78. As shown, for example, in FIGS. 3 and 4, with the filter cartridge 74 installed in the filter housing 72, the clocking tabs 141 are disposed within the clocking slots 96. For example, each clocking tab 141 may be disposed within a respective clocking slot 96. With the clocking tabs 141 disposed in the clocking slots 96, the clocking tabs 141 are configured to prevent or otherwise limit rotation of the filter cartridge 74 about the longitudinal axis 78 and, as a result, to also prevent or otherwise limit rotation of the filter cartridge 74 relative to the filter housing 72 and the filter cover 76.

Figure 5:
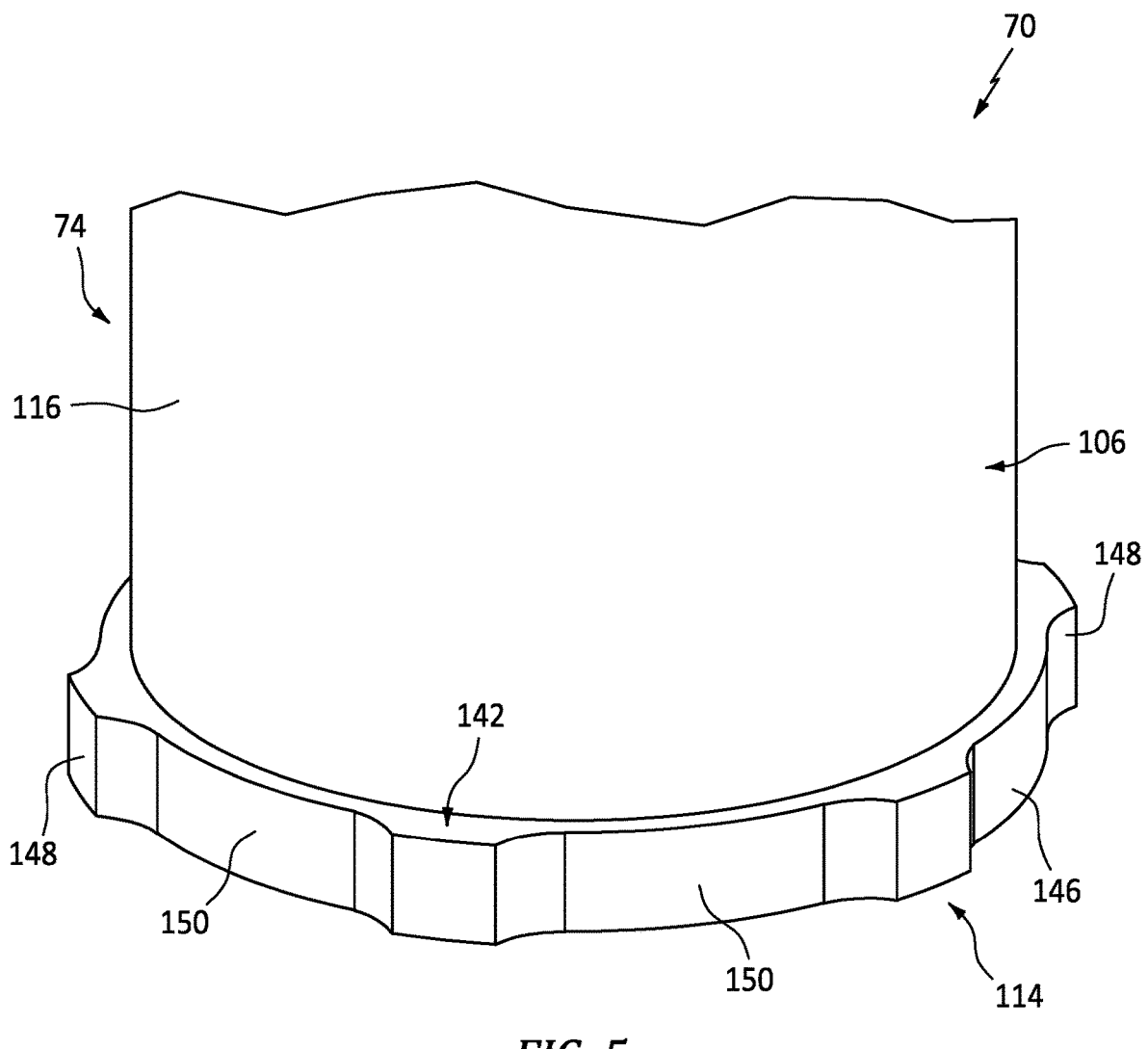
FIG. 5 illustrates a perspective view of a bottom portion of the filter assembly of FIG. 2, in accordance with one or more embodiments of the present disclosure.

As shown in FIG. 5, the centering ring 110 is disposed on the filter medium 106 at (e.g., on, adjacent, or proximate) the second end 114. The centering ring 110 includes a ring body 142. The ring body 142 may be in contact with or otherwise attached to the filter medium 106 on the second end 114, the exterior surface 116, and/or the interior surface 118. The ring body 142 may obstruct the filter passage 120 at the second end 114, thereby preventing lubricant from the inlet 88 from flowing into the filter passage 120 through the second end 114. The ring body 142 includes a centering portion 146. The centering portion 146 is disposed at (e.g., on, adjacent, or proximate) the exterior surface 116. The centering portion 146 of FIGS. 2 and 5 forms a series of circumferentially alternating protrusions 148 and grooves 150. The protrusions 148 are disposed radially outward of the grooves 150. With the filter cartridge 74 installed in the filter housing 72, the protrusions 148 may be disposed in contact with or proximate the interior surface 86. The protrusions 148 may minimize radial movement of the second end 114 during removal of the filter cartridge 74 from the filter housing 72, thereby facilitating a reduction in the likelihood and/or the severity of physical contact (e.g., rubbing, scraping, banging, etc.) between the filter cartridge 74 and the filter housing 72 as the filter cartridge 74 is removed. Excessive physical contact between the filter cartridge 74 and the filter housing 72 may cause contaminants (e.g., particulate matter) retained by the filter medium 106 to become dislodged and fall into the filter housing 72. The grooves 150 direct lubricant flow from the inlet 88 past the centering ring 110 so that the lubricant flow may pass through the filter medium 106. The present disclosure is not limited to the particular centering ring 110 configuration of FIGS. 2 and 5, and other centering ring configurations may be contemplated, in accordance with the present disclosure, to limit radial movement at (e.g., on, adjacent, or proximate) the second end 114 while also facilitating the passage of lubricant flow (e.g., using grooves, apertures, channels, etc.).

FIG. 2 illustrates the filter cover 76 installed with the filter housing 72 and the filter cartridge 74. The filter cover 76 includes a cover body 152, a cover packing 166, and an exterior packing 144. Each of the cover packing 166 and the exterior packing 144 extend circumferentially about (e.g., completely around) the longitudinal axis 78. The cover body 152 includes an exterior cover portion 154, a filter attachment ring portion 156, and one or more arm portions 158.

With the filter cover 76 installed in the filter assembly 70, the exterior cover portion 154 is mounted to or otherwise disposed on the filter housing 72 at (e.g., on, adjacent, or proximate) the filter opening 92. The exterior cover portion 154 is configured to seal the filter opening 92. The exterior cover portion 154 includes an interior side 160 and an exterior side 162. The interior side 160 forms a boundary of the filter bore 94 at (e.g., on, adjacent, or proximate) the first end 82. The exterior cover portion 154 includes a handle 164. The handle 164 is disposed at (e.g., on, adjacent, or proximate) the exterior side 162 to allow a user to securely grip the filter cover 76. The cover pack 166 is disposed on the exterior cover portion 154, for example, between the interior side 160 and the exterior side 162. With the filter cover 76 installed in the filter assembly 70, the cover packing 166 contacts the interior surface 86 to form a fluid seal between the housing body 80 and the filter cover 76 at (e.g., on, adjacent, or proximate) the filter opening 92. The exterior cover portion 154 forms one or more fastener apertures (not shown) and a clocking pin aperture 168. Fastener apertures of the exterior cover portion 154 and respective fastener apertures of the housing body 80 may allow the filter cover 76 to be securely mounted to the filter housing 74 using one or more fasteners 170 (e.g., threaded fasteners) as shown, for example, in FIG. 2. FIG. 6 illustrates the exterior cover portion 154 forming the clocking pin aperture 168. The clocking pin aperture 168 extends (e.g., axially extends) through the exterior cover portion 154 from the interior side 160 to the exterior side 162. As can be understood from FIG. 6, with the filter cover 76 installed in the filter assembly 70, the clocking pin aperture 168 may be disposed axially adjacent the clocking pin aperture 98 and the clocking pin aperture 168 may be circumferentially and radially aligned with the clocking pin aperture 98, such that the clocking pin aperture 168 and the clocking pin aperture 98 may cooperatively receive the clocking pin 104. Alignment of the clocking pin aperture 168 and the clocking pin aperture 98, during installation of the filter cover 76, may facilitate mistake proofing of the installation process by ensuring that the filter cover 76 is installed in the filter assembly 70 with the correct circumferential orientation.

As shown in FIG. 3, the filter attachment ring portion 156 includes an axially-extending portion 172, an inner diameter ring 174, and an outer diameter ring 176. Each of the axially-extending portion 172, the inner diameter ring 174, and the outer diameter ring 176 extend circumferentially about (e.g., completely around) the longitudinal axis 78.

The axially-extending portion 172 includes a first side 178, a second side 180, an inner diameter end 182, and an outer diameter end 184. The axially-extending portion 172 extends (e.g., axially extends) between and to the inner diameter end 182 and the outer diameter end 184. The inner diameter end 182 forms a filter outlet passage 186 through the axially-extending portion 172 along the longitudinal axis 78. The filter outlet passage 186 may be coincident with the filter outlet passage 134, for example, along the longitudinal axis 78.

The inner diameter ring 174 is disposed at (e.g., on, adjacent, or proximate) the inner diameter end 182 and/or the filter outlet passage 186. The inner diameter ring 174 extends between (e.g., axially between) and to a first end 188 of the inner diameter ring 174 and a second end 190 of the inner diameter ring 174. The first end 188 is disposed at (e.g., on, adjacent, or proximate) the second side 180. The inner diameter ring 174 extends inward (e.g., axially inward) to the second end 190 (e.g., in an axial direction toward the filter medium 106). The inner diameter ring 174 includes one or more locking tabs 192. The locking tabs 192 may be referred to herein as a "second set of locking tabs" 192. The locking tabs 192 may be disposed at (e.g., on, adjacent, or proximate) the second end 190. The locking tabs 192 may generally extend inward (e.g., radially inward) at (e.g., on, adjacent, or proximate) the second end 190. The locking tabs 192 may be circumferentially distributed (e.g., circumferentially spaced) about the longitudinal axis 78. As shown in FIGS. 2-4, the second set of locking tabs 192 is configured to engage the first set of locking tabs 136. For example, the filter cartridge 74 may be rotated relative to the filter cover 76 to engage the first set of locking tabs 136 with the second set of locking tabs 192. Engagement between the first set of locking tabs 136 with the second set of locking tabs 192 may axially fix the filter cartridge 74 relative to the filter cover 76. Each of the locking tabs 192 may include a rotation stop 193 configured to limit rotation of the first set of locking tabs 136 relative to the second set of locking tabs 192. The rotation stop 193 of each locking tab 192 may additionally facilitate circumferential positioning of the first set of locking tabs 136 relative to the second set of locking tabs 192 by a user.

The outer diameter ring 176 is disposed outward (e.g., radially outward) of the inner diameter ring 174. The outer diameter ring 176 includes an exterior surface 194 and an interior surface 196. The exterior surface 194 may form a radially outmost surface of the filter attachment ring portion 156. The exterior surface 194 extends circumferentially about (e.g., completely around) the longitudinal axis 78. The exterior packing 144 may be disposed at (e.g., on, adjacent, or proximate) the exterior surface 194. The interior surface 196 is disposed in contact with the interior packing 128 to form a fluid seal between the filter attachment ring portion 156 (e.g., the outer diameter ring 176) and the top cap 108 (e.g., the outer diameter ring 126).

The one or more arm portions 158 extend between (e.g., axially between) and connect the exterior cover portion 154 to the filter attachment ring portion 156. The arm portions 158 may be circumferentially distributed (e.g., circumferentially spaced) about the longitudinal axis 78 to allow lubricant exiting the filter outlet passage 186 to flow out of the filter cover 76 and into the outlet 90. However, the one or more arm portions 158 are not limited to this particular configuration, and the one or more arm portions 158 may have any shape and/or orientation which allows lubricant to flow through the cover body 152 from the filter outlet passage 186 to the outlet 90 (e.g., through one or more openings formed by the one or more arm portions 158).

Referring to FIG. 2, in operation, lubricant may flow through the filter assembly 70 along a lubricant flow path L. For example, the lubricant flows into the filter bore 94 (e.g., the inlet bore 100) from the inlet 88. The lubricant is directed through the filter medium 106 and into the filter passage 120, thereby allow the filter medium 106 to remove contaminants from the lubricant. The lubricant flows through the filter passage 120, the filter outlet passage 134, and the filter outlet passage 186 into the outlet bore 102, whereby the lubricant is directed into the outlet 90.

The filter assembly 70 of the present disclosure includes features to facilitate installation and removal of the filter cartridge 74 while also reducing the risk of introducing contaminants from the filter cartridge 74 into the associated lubrication system 34. For example, engagement between the first set of locking tabs 136 and the second set of locking tabs 192 allows the filter cartridge 74 and the filter cover 76 to be secured to one another and installed into or removed from the filter housing 72 together, as a unit. As noted above, the engagement between the first set of locking tabs 136 and the second set of locking tabs 192 also allows the filter cartridge 74 and the filter cover 76 to be axially fixed relative to one another, thereby facilitating positioning of the interior packing 128 and the exterior packing 144 to ensure that a fluid seal is formed between the inlet 88 and the outlet 90 (e.g., to direct lubricant from the inlet 88 to the outlet 90 through the filter medium 106). The axial fixing of the filter cartridge 74 relative to the filter cover 76 also reduces the risk of the filter cartridge 74 falling into the filter bore 94 toward the inlet 88. Clocking features of the filter assembly 70 (e.g., the clocking slots 96, the clocking pin aperture 98, the clocking pin 104, the clocking tabs 141, and the clocking pin aperture 168) further facilitate engagement between the components of the filter assembly 70 (e.g., the filter housing 72, the filter cartridge 74, and the filter cover 76). As discussed above, the positioning of the clocking tabs 141 within the clocking slots 96 prevents or otherwise limits rotation of the filter cartridge 74. Accordingly, the clocking tabs 141 and the clocking slots 96 may cooperatively prevent or otherwise limit rotation of the filter cartridge 74 (e.g., caused by vibration or other operating conditions of the lubrication system 34 and/or gas turbine engine 10), thereby maintaining engagement between the first set of locking tabs 136 and the second set of locking tabs 192. The clocking pin aperture 98, the clocking pin 104, and the clocking pin aperture 168 may facilitate mistake-proof assembly and installation of the components of the filter assembly 70 (e.g., the filter housing 72, the filter cartridge 74, and the filter cover 76). For example, insertion of the clocking pin 104 into the clocking pin aperture 98 and the clocking pin aperture 168 may only be possible with the filter cartridge 74 and the filter cover 76 properly assembled together and installed in the filter housing 72.

Figure 7:
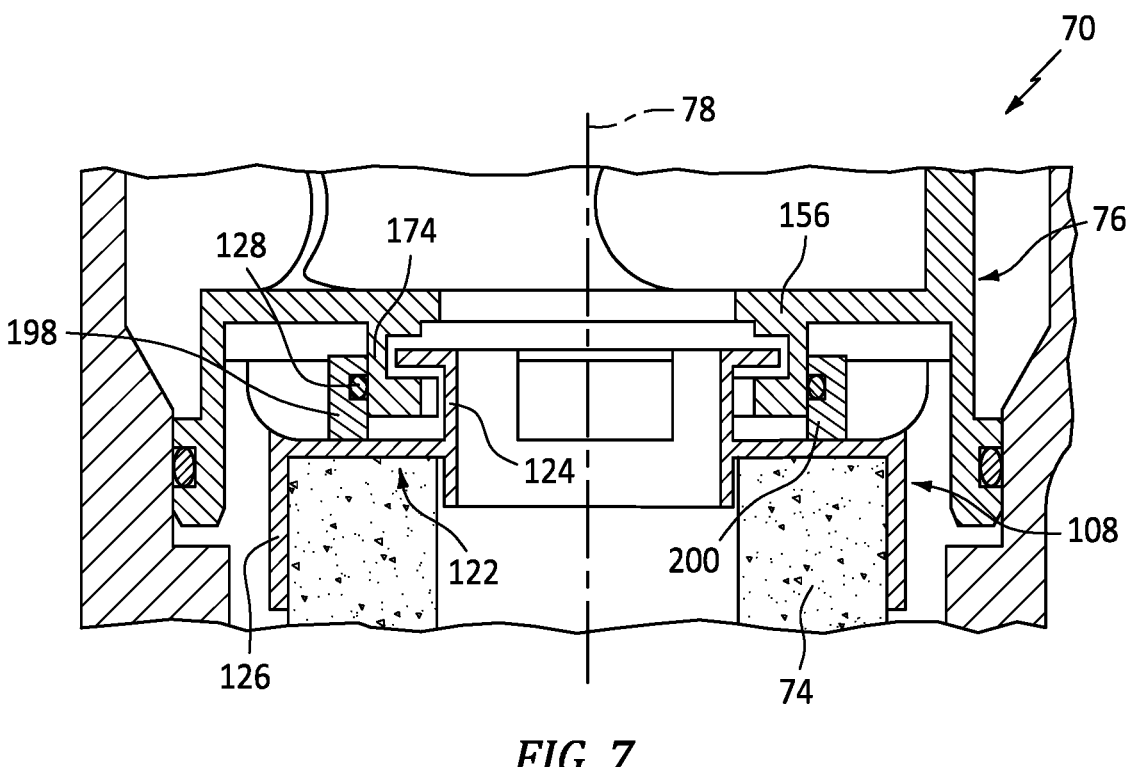
FIG. 7 illustrates a cutaway view of a portion of another filter assembly, in accordance with one or more embodiments of the present disclosure.

Referring to FIG. 7, a portion of another embodiment of the filter assembly 70 is illustrated. In the embodiment of FIG. 7, the cap body 122 includes the inner diameter ring 124, the outer diameter ring 126, and an intermediate diameter ring 198. The intermediate diameter ring 198 is disposed between (e.g., radially between) the inner diameter ring 124 and the outer diameter ring 126. The intermediate diameter ring 198 of FIG. 7 includes an inner radial surface 200 facing the longitudinal axis 78. The inner radial surface 200 extends circumferentially about (e.g., completely around) the longitudinal axis 78. The interior packing 128 is disposed at (e.g., on, adjacent, or proximate) the inner radial surface 200. The interior packing 128 of FIG. 7 contacts the inner diameter ring 174 to form a fluid seal between the top cap 108 (e.g., the intermediate diameter ring 198) and the filter cover 76 (e.g., the filter attachment ring portion 156).

Figure 8:
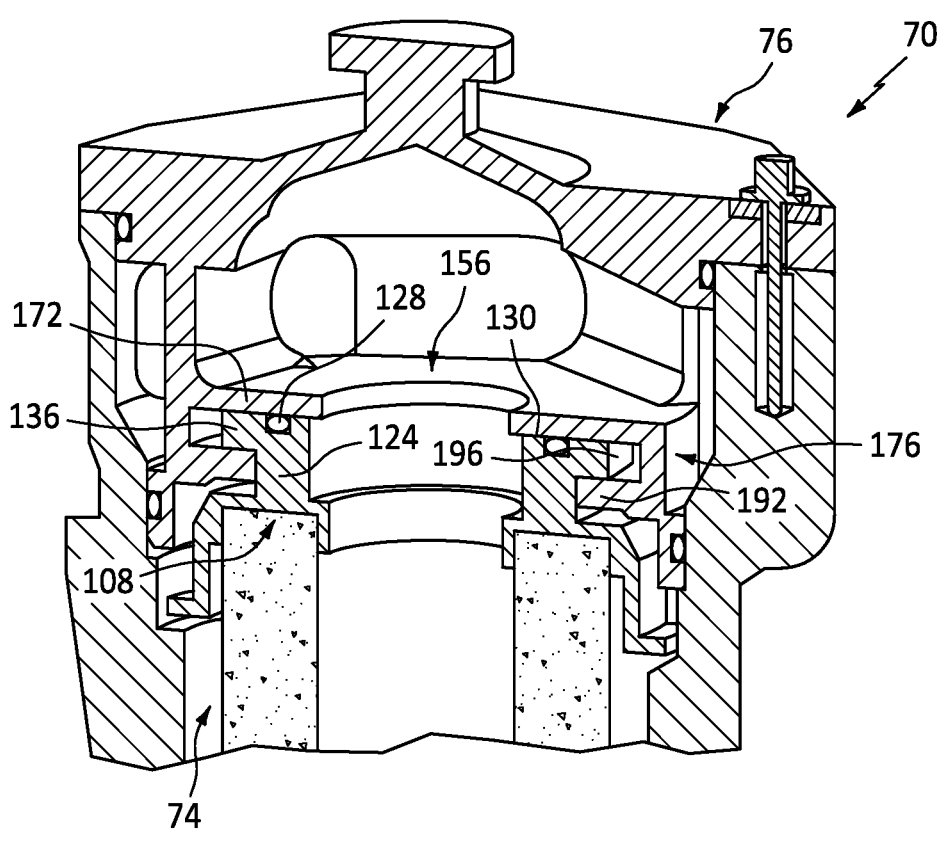
FIG. 8 illustrates a cutaway view of a portion of another filter assembly, in accordance with one or more embodiments of the present disclosure.
Figure 9:
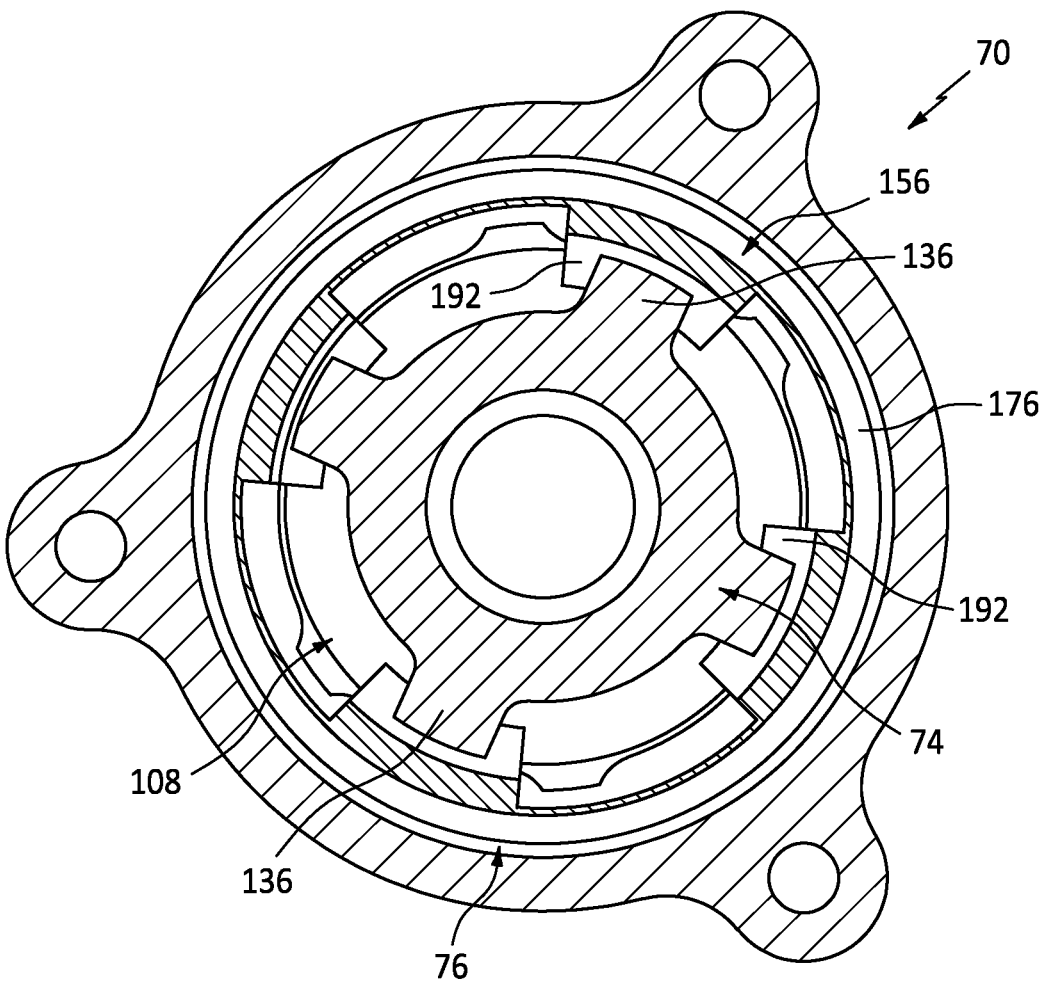
FIG. 9 illustrates a cutaway view of a portion of the filter assembly of FIG. 8, in accordance with one or more embodiments of the present disclosure.

Referring to FIGS. 8-9, portions of another embodiment of the filter assembly 70 are illustrated. In the embodiment of FIGS. 8 and 9, the interior packing 128 is disposed at (e.g., on, adjacent, or proximate) the first end 130 (e.g., a radially-extending surface of the first end 130). The interior packing 128 contacts the filter attachment ring portion 156 (e.g., the axially-extending portion 172) to form a fluid seal between the top cap 108 (e.g., the inner diameter ring 124) and the filter cover 76 (e.g., the axially-extending portion 172). In the embodiment of FIGS. 8 and 9, the filter attachment ring portion 156 may not include an inner diameter ring 174. Instead, the outer diameter ring 176 may include the one or more locking tabs 192. The locking tabs 192 may extend inward (e.g., radially inward) from the interior surface 196. The locking tabs 192 of FIGS. 8 and 9 may be circumferentially distributed (e.g., circumferentially spaced) about the longitudinal axis 78. As shown in FIGS. 8-9, the second set of locking tabs 192 is configured to engage the first set of locking tabs 136. For example, the filter cartridge 74 may be rotated relative to the filter cover 76 to engage the first set of locking tabs 136 with the second set of locking tabs 192. FIG. 9 illustrates the first set of locking tabs 136 disposed on the second set of locking tabs 192. Engagement between the first set of locking tabs 136 with the second set of locking tabs 192 may axially fix the filter cartridge 74 relative to the filter cover 76.

Figure 10:
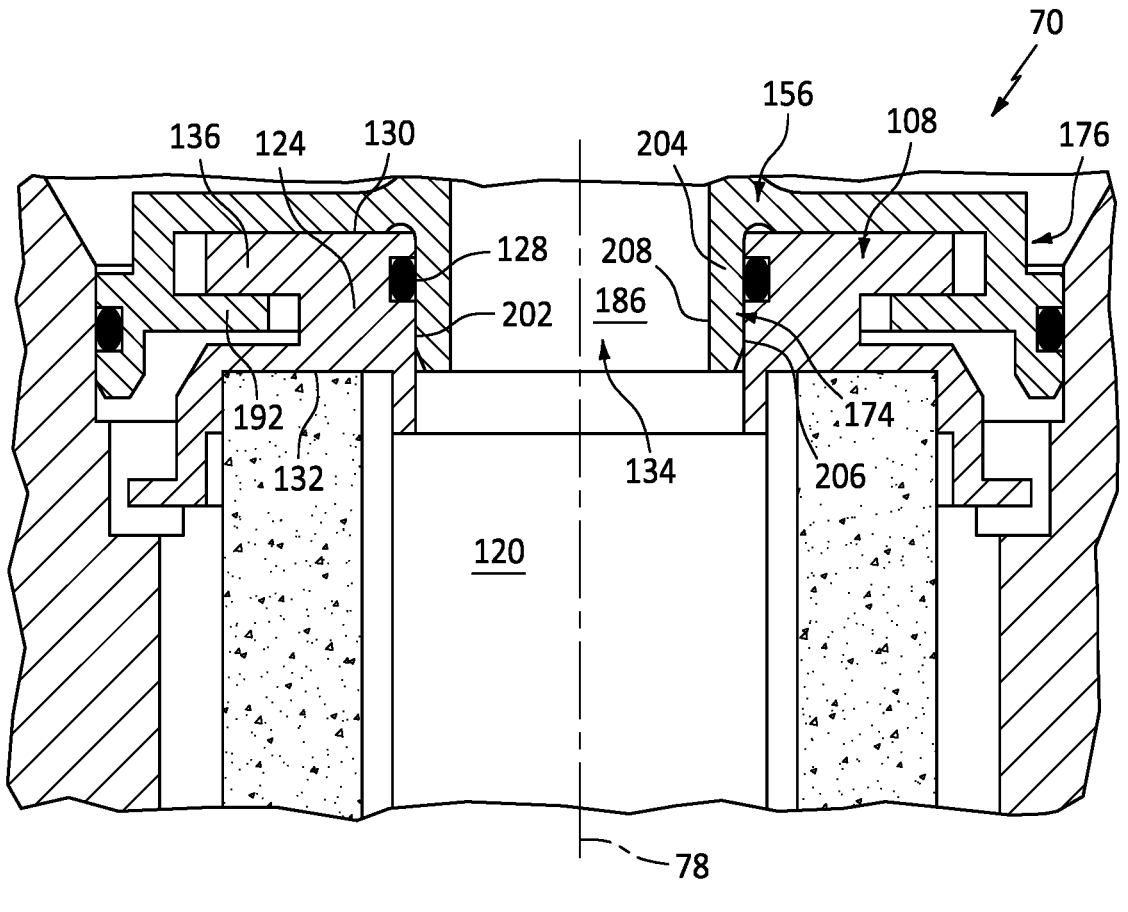
FIG. 10 illustrates a cutaway view of a portion of another filter assembly, in accordance with one or more embodiments of the present disclosure.

Referring to FIG. 10, a portion of another embodiment of the filter assembly 70 is illustrated. In the embodiment of FIG. 10, the interior packing 128 is disposed at (e.g., on, adjacent, or proximate) an inner radial surface 202 of the inner diameter ring 124. The inner radial surface 202 forms the filter outlet passage 134 through the top cap 108 along the longitudinal axis 78. The inner radial surface 202 and the filter outlet passage 134 extend between the first end 130 and the second end 132. The filter outlet passage 134 is coincident with the filter passage 120, for example, along the longitudinal axis 78. The inner diameter ring 124 of FIG. 10 further includes the locking tabs 136 extending outward (e.g., radially outward) at (e.g., on, adjacent, or proximate) the first end 130. As noted above, the locking tabs 136 may be circumferentially distributed (e.g., circumferentially spaced) about the longitudinal axis 78. The filter attachment ring portion 156 of FIG. 10 includes the inner diameter ring 174 and the outer diameter ring 176. The inner diameter ring 174 of FIG. 10 forms a spigot 204 which extends axially through the top cap 108 (e.g., through the filter outlet passage 134). The spigot 204 includes an outer radial surface 206 and an inner radial surface 208. Each of the outer radial surface 206 and the inner radial surface 208 may extend axially. The interior packing 128 contacts the spigot 204 (e.g., the outer radial surface 206) to form a fluid seal between the top cap 108 (e.g., the inner diameter ring 124) and the filter cover 76 (e.g., the spigot 204). The inner radial surface 208 forms at least a portion of the filter outlet passage 186. The outer diameter ring 176 of FIG. 10 includes the one or more locking tabs 192. The locking tabs 192 may extend inward (e.g., radially inward). The locking tabs 192 of FIG. 10 may be circumferentially distributed (e.g., circumferentially spaced) about the longitudinal axis 78. As shown in FIG. 10, the second set of locking tabs 192 is configured to engage the first set of locking tabs 136. For example, similar to the filter cartridge of FIGS. 8 and 9, the filter cartridge 74 of FIG. 10 may be rotated relative to the filter cover 76 to engage the first set of locking tabs 136 with the second set of locking tabs 192. Engagement between the first set of locking tabs 136 with the second set of locking tabs 192 may axially fix the filter cartridge 74 relative to the filter cover 76.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A lubricant filter assembly comprising:
a filter housing, the filter housing including a housing body, the housing body forming an inlet, an outlet, a filter bore, and a filter bore opening, the filter bore including an inlet bore and an outlet bore, the inlet bore extending axially from the inlet to the outlet bore, the outlet bore extending axially from the inlet bore to the filter bore opening, the outlet disposed at the outlet bore;
a filter cartridge including a cylindrical filter medium and a top cap,
the cylindrical filter medium extending circumferentially about a longitudinal axis of the filter assembly, the cylindrical filter medium extending between and to a first filter end and a second filter end along the longitudinal axis, the cylindrical filter medium forming a filter passage extending from the first filter end to the second filter end,
the top cap disposed on the cylindrical filter medium at the first filter end, the top cap including an inner diameter ring, an outer diameter ring, and an interior packing, each of the inner diameter ring, the outer diameter ring, and the interior packing extending circumferentially about the longitudinal axis, the inner diameter ring forming a first filter outlet passage coincident with the filter passage, the inner diameter ring including a first set of locking tabs, the outer diameter ring radially circumscribing the cylindrical filter medium, and
the filter cartridge disposed within the filter bore with the first filter end at the outlet and the second filter end at the inlet; and
a filter cover attached to the filter cartridge and the filter housing, the filter cover including a second set of locking tabs, the second set of locking tabs configured to engage the first set of locking tabs to axially fix the filter cover relative to the filter cartridge.

2. The lubricant filter assembly of claim 1, wherein the outer diameter ring includes an outer radial side and the interior packing is disposed at the outer radial side.

3. The lubricant filter assembly of claim 1, wherein the inner diameter ring extends between and to a first axial end and a second axial end, the second axial end disposed within the filter passage, the interior packing disposed at the first axial end.

4. The lubricant filter assembly of claim 1, wherein the inner diameter ring includes an inner radial surface and the interior packing is disposed at the inner radial surface.

5. The lubricant filter assembly of claim 1, further comprising a filter cover attached to the filter cartridge, the filter cover including a second set of locking tabs, the second set of locking tabs configured to engage the first set of locking tabs to axially fix the filter cover relative to the filter cartridge.

6. The lubricant filter assembly of claim 5, wherein the filter cover includes an exterior cover portion, a filter attachment ring portion, and a plurality of arms, the exterior cover portion mounted to the filter attachment ring portion by the plurality of arms, the plurality of arms circumferentially spaced about the longitudinal axis, the filter attachment ring portion attached to the filter cartridge.

7. The lubricant filter assembly of claim 6, wherein:

the filter attachment ring portion includes a cover axially-extending portion and a cover outer diameter ring, the cover axially-extending portion forming a second filter outlet passage coincident with the first filter outlet passage, the cover outer diameter ring extending axially from the cover axially-extending portion;

the filter cover includes an exterior packing, the exterior packing disposed on the cover outer diameter ring radially outside of the interior packing; and each of the cover axially-extending portion, the cover outer diameter ring, and the exterior packing extend circumferentially about the longitudinal axis.

8. The lubricant filter assembly of claim 7, wherein the cover outer diameter ring is sealingly engaged with the interior packing.

9. The lubricant filter assembly of claim 1, wherein the inlet bore has a first diameter and the outlet bore has a second diameter, the second diameter greater than the first diameter.

10. The lubricant filter assembly of claim 1, wherein:

the housing body forms a set of clocking slots circumferentially spaced about the inlet bore;

the outer diameter ring includes a set of clocking tabs circumferentially spaced about the top cap; and each clocking tab of the set of clocking tabs is positioned within a respective clocking slot of the set of clocking slots to limit a rotation of the filter cartridge within the filter housing.

11. The lubricant filter assembly of claim 1, wherein the filter cover includes an exterior packing disposed radially outside of the interior packing, and the exterior packing is sealingly engaged with the housing body.

12. The lubricant filter assembly of claim 1, further comprising a clocking pin, wherein the filter cover includes a first clocking pin aperture and the filter housing includes a second clocking pin aperture, and the clocking pin is configured to be positioned within the first clocking pin aperture and the second clocking pin aperture with the filter cover attached to the filter housing.

13. A lubricant filter assembly comprising:

a filter housing, the filter housing including a housing body, the housing body forming an inlet, an outlet, a filter bore, and a filter bore opening, the filter bore including an inlet bore and an outlet bore, the inlet bore extending axially from the inlet to the outlet bore, the outlet bore extending axially from the inlet bore to the filter bore opening, the outlet disposed at the outlet bore, the housing body forming a set of clocking slots circumferentially spaced about the inlet bore; and a filter cartridge including a cylindrical filter medium and a top cap, the cylindrical filter medium extending circumferentially about a longitudinal axis of the filter assembly, the cylindrical filter medium extending between and to a first filter end and a second filter end along the longitudinal axis, the cylindrical filter medium forming a filter passage extending from the first filter end to the second filter end, the top cap disposed on the cylindrical filter medium at the first filter end, the top cap including an inner diameter ring, an outer diameter ring, and an interior packing, each of the inner diameter ring, the outer diameter ring, and the interior packing extending circumferentially about the longitudinal axis, the inner diameter ring forming a first filter outlet passage coincident with the filter passage, the inner diameter ring including a first set of locking tabs, the outer diameter ring radially circumscribing the cylindrical filter medium, the outer diameter ring including a set of clocking tabs circumferentially spaced about the top cap, each clocking tab of the set of clocking tabs positioned within a respective clocking slot of the set of clocking slots to limit a rotation of the filter cartridge within the filter housing, and the filter cartridge disposed within the filter bore with the first filter end at the outlet and the second filter end at the inlet.

14. A lubricant filter assembly comprising:

a filter housing, the filter housing including a housing body, the housing body forming an inlet, an outlet, a filter bore, and a filter bore opening, the filter bore including an inlet bore and an outlet bore, the inlet bore extending axially from the inlet to the outlet bore, the outlet bore extending axially from the inlet bore to the filter bore opening, the outlet disposed at the outlet bore;

a filter cartridge including a cylindrical filter medium and a top cap, the cylindrical filter medium extending circumferentially about a longitudinal axis of the filter assembly, the cylindrical filter medium extending between and to a first filter end and a second filter end along the longitudinal axis, the cylindrical filter medium forming a filter passage extending from the first filter end to the second filter end, the top cap disposed on the cylindrical filter medium at the first filter end, the top cap including an inner diameter ring, an outer diameter ring, and an interior packing, each of the inner diameter ring, the outer diameter ring, and the interior packing extending circumferentially about the longitudinal axis, the inner diameter ring forming a first filter outlet passage coincident with the filter passage, the inner diameter ring including a first set of locking tabs, the outer diameter ring radially circumscribing the cylindrical filter medium, and the filter cartridge disposed within the filter bore with the first filter end at the outlet and the second filter end at the inlet; and a filter cover attached to the filter cartridge, the filter cover including a second set of locking tabs, the second set of locking tabs configured to engage the first set of locking tabs to axially fix the filter cover relative to the filter cartridge, the filter cover including an exterior cover portion, a filter attachment ring portion, and a plurality of arms, the exterior cover portion mounted to the filter attachment ring portion by the plurality of arms, the plurality of arms circumferentially spaced about the longitudinal axis, the filter attachment ring portion attached to the filter cartridge, the filter attachment ring portion including a cover axially-extending portion and a cover outer diameter ring, the cover axially-extending portion forming a second filter outlet passage coincident with the first filter outlet passage, the cover outer diameter ring extending axially from the cover axially-extending portion, the filter cover further including an exterior packing, the exterior packing disposed on the cover outer diameter ring radially outside of the interior packing, each of the cover axially-extending portion, the cover outer diameter ring, and the exterior packing extending circumferentially about the longitudinal axis.

15. The lubricant filter assembly of claim 14, wherein the cover outer diameter ring is sealingly engaged with the interior packing.

* * * * *